US012548372B2

(12) United States Patent
Nguyen et al.

(10) Patent No.: US 12,548,372 B2
(45) Date of Patent: Feb. 10, 2026

(54) WEIGHTED FACTORIZATION FOR HUMAN-OBJECT-INTERACTION DETECTION

(71) Applicant: Accenture Global Solutions Limited, Dublin (IE)

(72) Inventors: David Nguyen, Newark, CA (US); Hailing Zhou, Shenzhen (CN); Nan Ke, Xiamen (CN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 432 days.

(21) Appl. No.: 18/153,166

(22) Filed: Jan. 11, 2023

(65) Prior Publication Data

US 2024/0233440 A1  Jul. 11, 2024

(51) Int. Cl.
 *G06V 40/20* (2022.01)
 *G06V 10/40* (2022.01)
 *G06V 10/77* (2022.01)

(52) U.S. Cl.
CPC ............. *G06V 40/20* (2022.01); *G06V 10/40* (2022.01); *G06V 10/77* (2022.01)

(58) Field of Classification Search
CPC ........ G06V 40/20; G06V 10/40; G06V 10/77; G06V 10/82
See application file for complete search history.

(56) References Cited

U.S. PATENT DOCUMENTS

| | | | |
|---|---|---|---|
| 2018/0101955 A1* | 4/2018 | Varadarajan | G06T 7/73 |
| 2020/0302232 A1* | 9/2020 | Kilickaya | G06V 10/273 |
| 2022/0405501 A1* | 12/2022 | Chowdhury | G06V 10/82 |
| 2022/0414371 A1* | 12/2022 | Kilickaya | G06V 20/00 |
| 2025/0191349 A1* | 6/2025 | Tagomori | G06V 10/776 |

OTHER PUBLICATIONS

Zhijun Liang, "Pose-based Modular Network for Human-Object Interaction Detection" (Year: 2020).*
Carion et al., "End-to-End Object Detection with Transformers," CoRR, submitted on May 28, 2020, arXiv:2005.12872v3, 26 pages.
Chao et al., "Learning to Detect Human-Object Interactions," CoRR, submitted on Mar. 1, 2018, arXiv:1702.05448v2, 10 pages.
Girschick et al., "Fast R-CNN," CoRR, submitted on Sep. 27, 2015, arXiv:1504.08083v2, 9 pages.

(Continued)

*Primary Examiner* — Andrew M Moyer
*Assistant Examiner* — Ahmed A Nasher
(74) *Attorney, Agent, or Firm* — Mannava & Kang, P.C.

(57) ABSTRACT

Implementations include actions of receiving an image, providing a set of features for the image, determining a set of HOIs including one or more HOIs that are potentially represented in the image, providing sets of feature scores by, for each HOI in the set of HOIs, determining, by a first ML model, a set of feature scores for respective features in the set of features, generating, by a second ML model, sets of weights based on the set of HOIs, providing a set of final scores by, for each HOI in the set of HOIs, determining a final score based on a respective set of weights and the set of feature scores, each final score corresponding to a respective HOI in the set of HOIs, and selecting an output HOI for the image from the set of HOIs based on the set of final scores.

18 Claims, 5 Drawing Sheets

(56) References Cited

OTHER PUBLICATIONS

Girschick et al., "Rich feature hierarchies for accurate object detection and semantic segmentation," CoRR, submitted on Oct. 22, 2014, arXiv:1311.2524v5, 21 pages.
Kim et al., "HOTR: End-to-End Human-Object Interaction Detection with Transformers," CoRR, submitted on Apr. 28, 2021, arXiv:2104.13682v1, 10 pages.
Li et al., "Weakly Supervised Human-Object Interaction Detection in Video via Contrastive Spatiotemporal Regions," CoRR, submitted on Oct. 7, 2021, arXiv:2110.03562v1, 17 pages.

\* cited by examiner

WEIGHTED FACTORIZATION FOR HUMAN-OBJECT-INTERACTION DETECTION

BACKGROUND

Human activity recognition is the process of interpreting human motion using computer and machine vision technology. Human motion can be interpreted as activities, gestures, or behaviors. For example, human activity recognition can identify and name activities of a person based on gathered raw data from various sources (e.g., devices). Examples of such devices can include wearable sensors, electronic device sensors, camera devices, closed-circuit television, and some commercial off-the shelf equipment.

SUMMARY

Implementations of the present disclosure are generally directed to detecting human-object-interactions (HOIs) in images. More particularly, implementations of the present disclosure are directed to a HOI detection system that uses weighted factorization in detecting HOIs in images.

In some implementations, actions include receiving an image, providing a set of features for the image, the set of features including an object feature, a human feature, a pose feature, and a relationship feature, determining a set of HOIs including one or more HOIs that are potentially represented in the image, providing sets of feature scores by, for each HOI in the set of HOIs, determining, by a first machine learning (ML) model, a set of feature scores for respective features in the set of features, each set of feature scores corresponding to a respective HOI in the set of HOIs, generating, by a second ML model, sets of weights based on the set of HOIs, providing a set of final scores by, for each HOI in the set of HOIs, determining a final score based on a respective set of weights and the set of feature scores corresponding to the respective HOI, each final score in the set of final scores corresponding to a respective HOI in the set of HOIs, and selecting an output HOI for the image from the set of HOIs based on the set of final scores. Other implementations of this aspect include corresponding systems, apparatus, and computer programs, configured to perform the actions of the methods, encoded on computer storage devices.

These and other implementations can each optionally include one or more of the following features: generating sets of weights based on the set of HOIs includes generating, by a third ML model, sets of text embeddings, each set of text embeddings corresponding to a respective HOI, and processing, by the second ML model, the sets of text embeddings to generate the sets of weights; each set of weights in the sets of weights includes an object feature weight representing a relative importance of the object feature in selecting the output HOI for the image, a human feature weight representing a relative importance of the human feature in selecting the output HOI for the image, a pose feature weight representing a relative importance of the pose feature in selecting the output HOI for the image, and a relationship feature weight representing a relative importance of the relationship feature in selecting the output HOI for the image; determining the output HOI for the image from the set of HOIs based on the set of final scores includes selecting the output HOI as a HOI with a highest final score in the set of final scores; each final score is a weighted sum of features scores by applying respective weights in the set of weights; actions further include comparing the output HOI with a step in a pre-defined standard operation procedure (SOP) for a task, and proving feedback representative of whether the output HOI correspond to the step in the SOP; and the sets of weights are specific to the image and an HOI depicted in the image.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
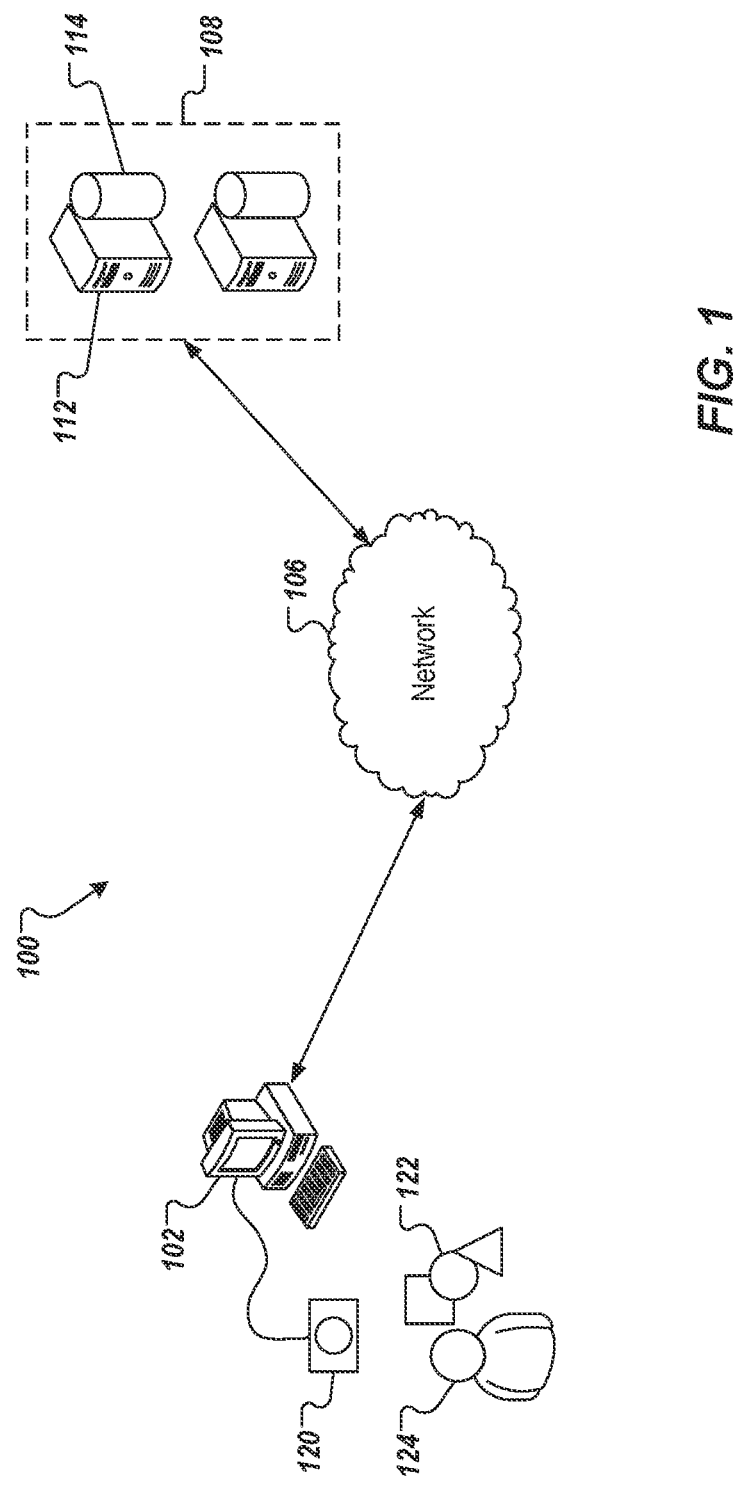
FIG. 1 depicts an example system that can execute implementations of the present disclosure.

Implementations of the present disclosure are generally directed to detecting human-object-interactions (HOIs) in images. More particularly, implementations of the present disclosure are directed to a HOI detection system that uses weighted factorization in detecting HOIs in images. The weighted factorization can generate weights for different features that are used in determining the HOI in the image. By considering the weight for each feature in different interactions, the HOI detection system described herein can determine the type of HOI more accurately and more efficiently than traditional approaches.

In some implementations, actions include receiving an image, providing a set of features for the image, the set of features including an object feature, a human feature, a pose feature, and a relationship feature, determining a set of HOIs including one or more HOIs that are potentially represented in the image, providing sets of feature scores by, for each HOI in the set of HOIs, determining, by a first machine learning (ML) model, a set of feature scores for respective features in the set of features, each set of feature scores corresponding to a respective HOI in the set of HOIs, generating, by a second ML model, sets of weights based on the set of HOIs, providing a set of final scores by, for each HOI in the set of HOIs, determining a final score based on a respective set of weights and the set of feature scores corresponding to the respective HOI, each final score in the set of final scores corresponding to a respective HOI in the set of HOIs, and selecting an output HOI for the image from the set of HOIs based on the set of final scores.

To provide further context, and as introduced above, HOI detection can have many human-centric applications like safety monitoring, standard operation procedure detection, and content retrieval in manufacturing and media domains. HOI detection is a critical trigram of building perception- and even cognition-level visual capability for machines to understand the world. HOI detection systems have been developed to automate HOI detection. For example, an HOI detection can receive images (e.g., frames of a video) and process the images to determine one or more HOIs represented in the images. Such HOI detection systems can use an HOI classifier that determines the HOI depicted in an image. However, traditional HOI detection systems have technical disadvantages. For example, to achieve an appropriate accuracy in HOI detection, the ML models implemented are relatively large and complex, and require a significant amount of time and computing resources for training. Further, the size of the ML model can require a relatively large memory footprint. For example, one traditional system can require approximately 70 hours of training time with a resulting ML model size of 159 MB.

In view of the foregoing, and as introduced above, implementations of the present disclosure are directed to detecting HOIs in images. More particularly, implementations of the present disclosure are directed to a HOI detection system that uses weighted factorization in detecting HOIs in images. The HOI detection system described herein can determine the type of interaction more accurately than traditional approaches. The HOI detection system can automatically monitor interactions of a user with one or more objects during, for example, execution of tasks of a process. In an example use case, the HOI detection system can determine whether the HOI (e.g., the interaction of the user with the object(s)) matches steps in a standard operation procedure (SOP). The HOI detection system can provide feedback on the HOI indicating whether the user has performed an expected task. The system can provide each user one-on-one attention as the user is performing a process and provide customized guidance.

The HOI detection system can monitor user interactions with complex and potentially dangerous equipment that require specific operating procedures. For example, the HOI detection system can monitor user interactions in various industries (e.g., home healthcare, manufacturing, hospitality, construction, food service, etc.). Because the HOI detection system can determine the interaction corresponding to each step of a task, the system can monitor the user's behavior in performing a task in a fine-grained scale and provide more accurate guidance and feedback.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented services that users can interact with using computing devices. For example, the server system 112 can host systems for training ML models of a HOI detection system in accordance with implementations of the present disclosure.

In the example of FIG. 1, a camera 120, objects 122, and a human 124 are depicted. The camera 120 can be any appropriate type of camera (e.g., still camera, video camera) that generates images representing entities in a scene of a real-world environment. In the context of the present disclosure, the camera 120 can generate images as digital data representing interactions between the human 124 and one or more of the objects 122. In accordance with implementations, images can be processed by a HOI detection system to detect one or more HOIs represented within the images. In some examples, the HOI detection system is executed on the computing device 102. In some examples, the HOI detection system is executed in the back-end system 108.

Figure 2A:
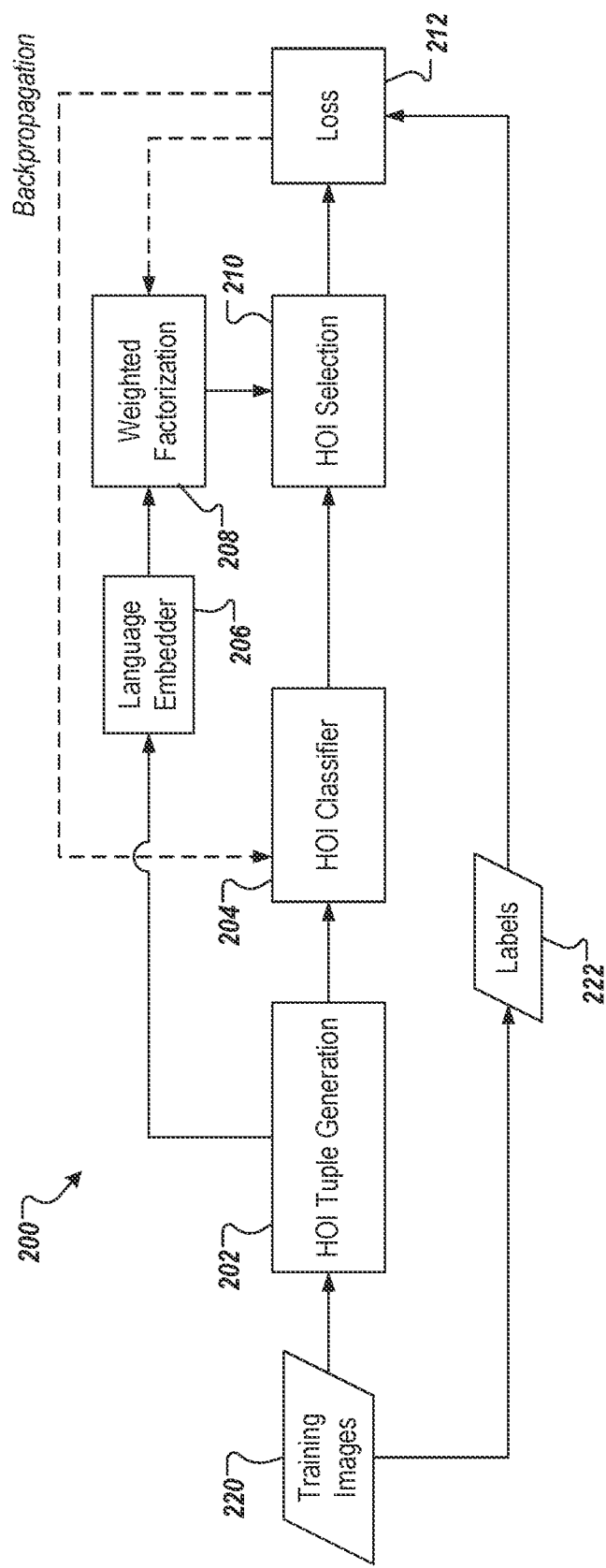
FIG. 2A depicts a conceptual architecture of a human-object-interaction (HOI) detection system during a training phase in accordance with implementations of the present disclosure.

FIG. 2A depicts a conceptual architecture of a HOI detection system 200 during a training phase in accordance with implementations of the present disclosure. In the example of FIG. 2A, the HOI detection system 200 includes a HOI tuple generation module 202, a HOI classifier 204, a language embedder 206, a weighted factorization model 208, and a HOI selection module 210. For training, the HOI detection system 200 includes a loss module 212. During training, the HOI detection system 200 processes a set of training images 220 and a set of labels 222 to train the HOI classifier 204 and the weighted factorization model 208.

In further detail, during training, the HOI detection system 200 can receive the set of training images 220 as input. Each training image in the set of training images 220 is associated with at least one label in the set of labels. Each label includes an HOI that is represented in a training image and serves as a ground truth for determining loss during training, as described in further detail herein. The HOI detection system 200 can process each image in the set of training images 220 using the HOI tuple generation module 202 for object detection, human detection, and one or more potential interactions between the human(s) and object(s) detected in the image.

Any appropriate techniques can be used for object detection, human detection, interaction detection and the like. Example techniques are described in detail in Fast R-CNN, Girschick et al., Sep. 27, 2015, *Rich feature hierarchies for accurate object detection and semantic segmentation*, Girschick et al., Oct. 22, 2014, and *Weakly Supervised Human-Object Interaction Detection in Video via Contras-* tive Spatiotemporal Regions, Li et al., Oct. 7, 2021, each of which is expressly incorporated herein by reference in their entireties.

Continuing, for each input image, the HOI tuple generation module 202 determines one or more objects, one or more humans, a pose for each human, and potential interactions between human(s) and object(s) included in the input image. For example, an object can be a chair and the interaction can be sitting (e.g., an HOI of <person, chair, sitting on>). In some examples, for each input image, a set of HOIs represented in the input image are determined and includes potential HOIs that could be represented in the image. For example, an object can be a chair and the interactions can be sitting on (e.g., an HOI of <person, chair, sitting on>), standing on (e.g., an HOI of <person, chair, standing on>), and lying on (e.g., an HOI of <person, chair, lying on>).

In some examples, the HOI tuple generation module 202 determines features for each object and each human, as well as respective bounding boxes. In some examples, a human bounding box represents an area within an input image that a human is depicted in and an object bounding box represents an area within the input image that an object is depicted in. In some examples, the bounding boxes overlap, the overlap indicative of a relationship between the human and the object. In some examples, object, human, interaction detection is performed by a pre-trained ML model prior to training of the HOI classifier 204 and the weighted factorization model 208. The HOI classifier 204 can obtain HOI tuples. The HOI tuples can include human-object pairs included in each image. In some examples, multiple human-object pairs can be included in one image. To generate all possible pairs, the HOI detection system 200 can enumerate all human-object combinations. For each human-object pair, the HOI tuples can correspond to multiple possible interactions. The HOI tuple can include multiple features, such as an object feature, a human feature, a pose feature, and a relationship feature (e.g., as represented by overlap of bounding boxes).

The HOI classifier 204 can use the HOI tuples to generate scores for HOI classes. For example, the HOI classifier receives an image and human-object tuples from the HOI tuple generation module 202. In some examples (e.g., in an end-to-end arrangement), the HOI classifier extracts an object feature, a human feature, a pose feature, and a relationship feature (e.g., human-object position relationship as represented by overlap of bounding boxes). In some examples, each of the object feature, the human feature, the human pose, and the human-object relationship is provided as an embedding (a multi-dimensional vector). The HOI classifier 204 processes the object feature, the human feature, the pose feature, and the relationship feature as respective streams to determine one or more HOIs depicted in the image. For example, an image can be determined to include a set of p HOIs, where p≥1. In some examples, the object feature, the human feature, the pose feature, and the relationship feature are processed through respective multilayer perceptron (MLP) models to provide a set of feature scores that includes respective feature scores for each HOT. For example, the following can be provided as output of the HOI classifier 204:

$$[H, O, I]_1, \ <s_{obj}, s_{hum}, s_{pose}, s_{rel}>_1$$

$$...$$

$$[H, O, I]_p, \ <s_{obj}, s_{hum}, s_{pose}, s_{rel}>_p$$

where $s_{obj}$ is a feature score indicating a confidence (likelihood) that the respective HOI is correct from the perspective of the object feature, $s_{hum}$ is a feature score indicating a confidence (likelihood) that the respective HOI is correct from the perspective of the human feature, $s_{pose}$ is a feature score indicating a confidence (likelihood) that the respective HOI is correct from the perspective of the pose feature, and $s_{rel}$ is a feature score indicating a confidence (likelihood) that the respective HOI is correct from the perspective of the relationship feature.

To illustrate this, the non-limiting example above can be considered, in which an image depicts a human and a chair. In this example, the following can be provided:

$$[\text{person, chair, sitting on}]_1, \ <s_{obj}, s_{hum}, s_{pose}, s_{rel}>_1$$

$$[\text{person, chair, standing on}]_2, \ <s_{obj}, s_{hum}, s_{pose}, s_{rel}>_2$$

$$[\text{person, chair, lying on}]_3, \ <s_{obj}, s_{hum}, s_{pose}, s_{rel}>_3$$

Here, $<s_{obj}, s_{hum}, s_{pose}, s_{rel}>_1$ are features scores of respective features, each indicating a confidence (likelihood) that the HOI [person, chair, sitting on] is correct from the perspective of the respective feature, $<s_{obj}, s_{hum}, s_{pose}, s_{rel}>_2$ are features scores of respective features, each indicating a confidence (likelihood) that the HOI [person, chair, standing on] is correct from the perspective of the respective feature, and $<s_{obj}, s_{hum}, s_{pose}, s_{rel}>_3$ are features scores of respective features, each indicating a confidence (likelihood) that the HOI [person, chair, lying on] is correct from the perspective of the respective feature.

The HOI classifier 204 can be provided using any appropriate HOI classification techniques. An example HOI classifier is described in Learning to Detect Human-Object Interactions, Chao et al., Mar. 1, 2018, which is expressly incorporated herein by reference in the entirety.

In accordance with implementations of the present disclosure, the HOI tuples generated by the HOI tuple generation module 202 are provided to the language embedder 206. In some examples, the language embedder 206 includes a pre-trained word embedding model (e.g., Word2Vec). In some implementations, the HOI detection system 200 can determine text of possible interactions of an input image, such as [person, chair, sitting on], [person, chair, standing on], and [person, chair, lying on], with continued reference to the non-limiting example.

In some examples, the language embedder 206 processes each HOI to convert the text of the HOI into word embeddings (multi-dimensional vectors), each word embedding encoding a respective word. For example, the following can be provided as output of the language embedder 206:

$$[H, O, I]_1, \ <e_{obj}, e_{person}, e_{int}>_1$$

$$...$$

$$[H, O, I]_p, \ <e_{obj}, e_{person}, e_{int}>_p$$

where $e_{obj}$ is a word embedding encoding the object, $e_{person}$ is a word embedding encoding person, and $e_{int}$ is a word embedding encoding the interaction.

To illustrate this, the non-limiting example above can be considered, in which an image depicts a human and a chair. In this example, the following can be provided:

$$[\text{person, chair, sitting on}]_1, \; <e_{pers}, e_{chair}, e_{sitting}>_1$$
$$[\text{person, chair, standing on}]_2, \; <e_{pers}, e_{chair}, e_{standing}>_2$$
$$[\text{person, chair, lying on}]_3, \; <e_{pers}, e_{chair}, e_{lying}>_3$$

Here, $e_{pers}$ is a word embedding for the text "person," $e_{chair}$ is a word embedding for the text "chair," $e_{sitting}$ is a word embedding for the text "sitting" (or "sitting_on"), $e_{standing}$ is a word embedding for the text "standing" (or "standing_on"), and $e_{lying}$ is a word embedding for the text "lying" (or "lying_on").

In some examples, the language embedder 206 processes each HOI to convert the text of the HOI into a sentence embedding (a multi-dimensional vector), each sentence embedding encoding a respective HOI. For example, the following can be provided as output of the language embedder 206:

$$[H, O, I]_1, \; <e_{sentt}>_1$$
$$\ldots$$
$$[H, O, I]_p, \; <e_{sent}>_p$$

where $e_{sent}$ is a sentence embedding collectively encoding the object, person, and the interaction.

The weighted factorization model 208 is trained to generate a set of weights for the input image. A weight can represent a relative importance of each feature in ultimately selecting a HOI for a respective input image. In other words, a weight is provided for the object feature, a weight is provided for the human feature, a weight is provided for the pose feature, and a weight is provided for the relationship feature (e.g., 30% object feature, 30% human feature, 10% pose feature, 30% relationship feature). In some implementations, the weighted factorization model 208 can be provided as a MLP model. In accordance with implementations of the present disclosure, the weighted factorization model 208 can generate weights for each feature (e.g., object feature, human feature, pose feature, relationship feature) based on the sets of word embeddings (or sentence embeddings) provided for the input image from the language embedder 206. For word embeddings, the following example representation can be provided:

$$<e_{obj}, e_{pers}, e_{int}>_1 \qquad <w_{obj}, w_{hum}, w_{pose}, w_{rel}>_1$$
$$\ldots \quad \to f_{weights} \to \quad \ldots$$
$$<e_{obj}, e_{pers}, e_{int}>_2 \qquad <w_{obj}, w_{hum}, w_{pose}, w_{rel}>_2$$

where $f_{weights}$ represents the weighted factorization model 208, $w_{obj}$ represents a weight to be applied to the object feature (object feature weight), $w_{hum}$ represents a weight to be applied to the human feature (human feature weight), $w_{pose}$ represents a weight to be applied to the pose feature (pose feature weight), and $w_{rel}$ represents a weight to be applied to the relationship feature (relationship feature weight), each for a respective HOI. For sentence embeddings, the following example representation can be provided:

$$<e_{sent}>_1 \qquad <w_{obj}, w_{hum}, w_{pose}, w_{rel}>_1$$
$$\ldots \quad \to f_{weights} \to \quad \ldots$$
$$<e_{sent}>_2 \qquad <w_{obj}, w_{hum}, w_{pose}, w_{rel}>_2$$

As indicated above, sets of weights are determined for each input image. Consequently, first sets of weights for a first input image are different from second sets of weights for a second input image. In this manner, the same feature can be given different weights in different interactions. For example, in the example interaction of a human sitting on a chair determined for an image, the relationship feature may be important, and thus the weight for this feature may relatively large. In another example interaction of a human kicking a football for another image, the relationship feature may be less important, and thus the weight for this feature may be relatively small. By considering the weight for each feature in different interactions in different images, the HOI detection system 200 can determine the HOIs of images more accurately.

With continued reference to FIG. 2A, and as discussed above, the HOI classifier 204 can generate sets of scores for each HOI in a set of HOIs determined for an input image. The weighted factorization model 208 generates sets of weights for the input image, each set of weight corresponding to a respective HOI. The HOI selection module 210 can combine the feature scores using the weights for the respective features to generate a set of final scores that includes a final score for each HOI. For example, the final score can be calculated as a weighted sum of the feature scores according to the weights of the features. The following can be considered:

$$[H, O, I]_1 : \; <w_{obj} \times s_{obj} + w_{hum} \times s_{hum} + w_{pose} \times s_{pose} + w_{rel} \times s_{rel}>_1 \to S_1$$

$$\ldots$$

$$[H, O, I]_p : \; <w_{obj} \times s_{obj} + w_{hum} \times s_{hum} + w_{pose} \times s_{pose} + w_{rel} \times s_{rel}>_p \to S_p$$

where S indicates the final score for a respective HOI. Each final score in the set of final scores can represent the probability that the respective HOI is correct for the input image. The HOI detection system 200 can use the final scores to select an HOI as an inference result for the input image. For example, the HOI selection module 210 can select the HOI having the highest final score as the inference result (e.g., HOI→MAX($S_1, \ldots, S_p$)).

During training, the loss module 212 of the HOI detection system 200 can compare the inference results of the HOI selection module 210 with the respective labels in the set of labels 222 and determine respective loss values. As discussed above, each label in the set of labels 222 indicates a ground truth HOI for a respective training image in the set of training images 220. The loss can represent the difference between the inference result (e.g., predicted interaction) and the label (e.g., the true interaction). The loss can be used in backpropagation for iteratively training the HOI classifier 204 and the weighted factorization model 208. For example, parameters of the MLPs of the HOI classifier 204 and parameters of the MLP that is the weighted factorization model 208 can be iteratively adjusted during training based on loss values. This iterative training process can be repeated until the loss satisfies a threshold.

In general, a ML model can be iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

Figure 2B:
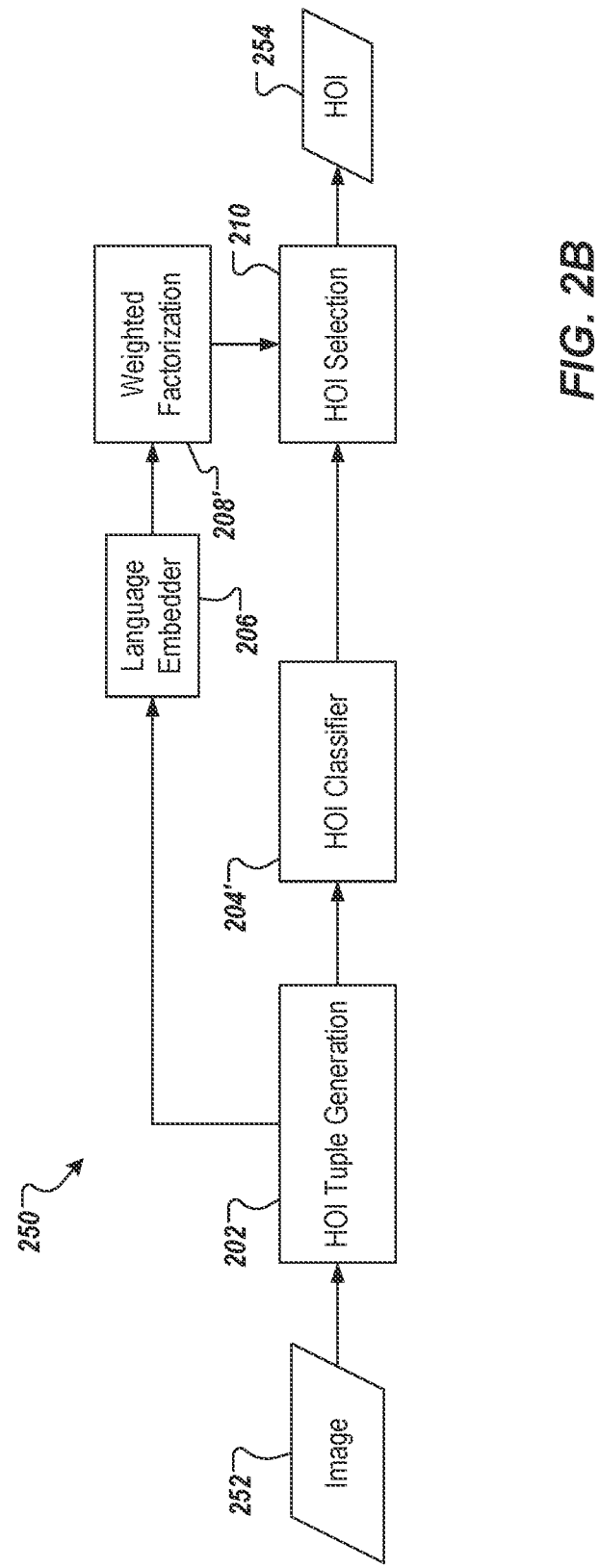
FIG. 2B depicts a conceptual architecture of the HOI detection system during an inference phase in accordance with implementations of the present disclosure.

FIG. 2B depicts a conceptual architecture of a HOI detection system 250 during an inference phase in accordance with implementations of the present disclosure. In the example of FIG. 2B, the HOI detection system 250 includes the HOI tuple generation module 202, the (trained) HOI classifier 204', the language embedder 206, the (trained) weighted factorization model 208', and the HOI selection module 210. Here, the HOI classifier 204' and the weighted factorization model 208' correspond to the HOI classifier 204 and the weighted factorization model 208 of FIG. 2A, respectively, after training and deployed for inference. As described in further detail herein, the HOI detection system 250 processes an image 252 to provide a HOI 254.

During the inference phase, the HOI detection system 250 can receive an image 252 (e.g., from computer-readable memory, from a camera). The HOI detection system can process image 252 for object, human, pose, and relationship detection, as described herein. The HOI tuple generation module 202 provides HOI tuples. Each HOI tuple can correspond to a potential HOI for the image 252. For each HOI tuple, multiple features, such as an object feature, a human feature, a pose feature, and a relationship feature, as described herein. The HOI classifier 204' processes the features of each HOI tuple to generate a feature score for each feature of the HOI tuple.

In accordance with implementations of the present disclosure, text of each HOI is provided to the language embedder 206, which converts the texts into respective word embeddings (or sentence embeddings), as described herein to provide a set of text embeddings for each HOI. The weighted factorization model 208' processes the sets of text embeddings to generate sets of weights for the image 252. That is, and as introduced above, the sets of weights are specific to the image 252 and each set of weights is specific to a HOI. The HOI selection module 210 receives the sets of scores and the sets of weights and determines final scores for each HOI in the set of HOIs. For example, and as described herein, each final score can be determined as a weighted sum by applying the respective set of weights to the respective sets of scores. The HOI uses the final scores to determine the HOI 254 from the set of HOIs that is selected as being represented in the image 252.

Figure 3:
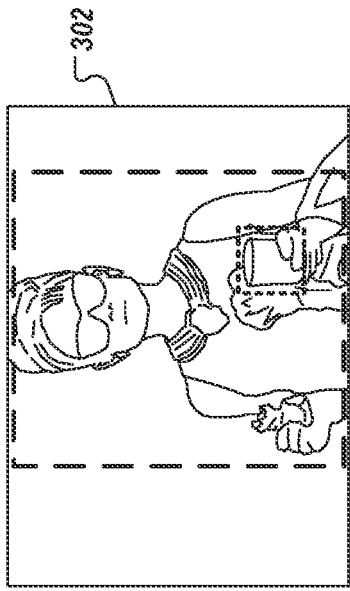
FIG. 3 depicts examples of HOI detection in images in accordance with implementations of the present disclosure.
Figure 3:
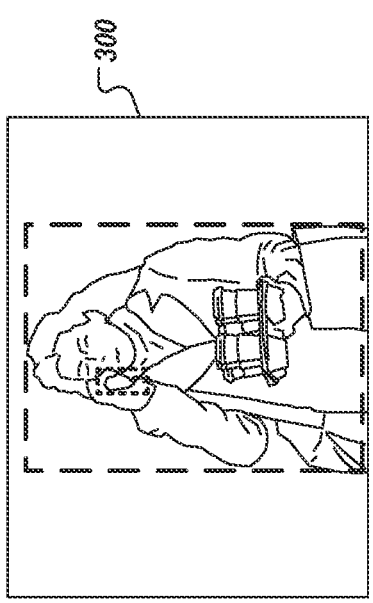
Figure 3:
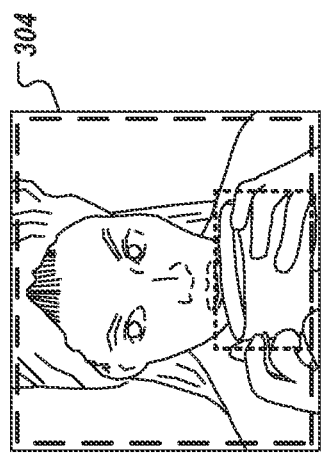

FIG. 3 depicts examples of HOI detection in images 300, 302, 304 in accordance with implementations of the present disclosure. As discussed above, the HOI detection system can use the HOI tuples to determine potential HOIs represented in each image 300, 302, 304. Each HOI tuple can include a set of features, such as an object feature, a human feature, a pose feature, and a relationship feature. For each potential HOI, a set of scores is determined. A set of weights is determined. Based on the set of weights and the sets of scores, the HOI detection system can determine a final score for each potential HOI.

For example, for the image 300, the HOI detection system can identify an object "phone," a human, a pose of the human, and a relationship between the phone and the human (e.g., relationship between bounding boxes). The HOI detection system can generate HOI tuples for the image 300 that include two potential HOIs: "a person holding a phone" and "a person talking on a phone." The HOI tuple can include a set of features, such as object feature, human feature, pose feature, relationship feature. For each potential HOI, the HOI detection system can determine a set of scores for each feature. The HOI detection system also determines sets of word embeddings including, for example, word embeddings for each of "people," "phone," "holding," and "talking_on." The word embeddings are processed to determine a set of weights, which includes a weight for each feature. Based on the set of weights, the HOI detection system can determine a final score for each potential HOI. For example, for the first possible interaction "a person holding a phone," the HOI detection system can determine a first final score $S_1$. For the second possible interaction "a person talking on a phone," the HOI detection system can determine a second final score $S_2$. The HOI detection system can determine the interaction with higher weighted score as the final classification result of the HOI in the image 300. In this example, the final classification result of the HOI can be "a person talking on a phone" (e.g., $S_2 > S_1$).

In the image 302, the HOI detection system can identify an object "cup," a human, a pose of the human, and a relationship between the cup and the human (e.g., relationship between bounding boxes). The HOI tuple can include a set of features, such as object feature, human feature, pose feature, relationship feature. For each potential HOI, the HOI detection system can determine a set of scores for each feature. The HOI detection system also determines sets of word embeddings including, for example, word embeddings for each of "people," "cup," "holding," and "drinking_with." The word embeddings are processed to determine a set of weights, which includes a weight for each feature. Based on the set of weights, the HOI detection system can determine a final score for each potential HOT. For example, for the first possible interaction "a person holding a cup," the HOI detection system can determine a first final score $S_1$. For the second possible interaction "a person drinking with a cup," the HOI detection system can determine a second final score $S_2$. The HOI detection system can determine the interaction with higher weighted score as the final classification result of the HOI in the image 302. In this example, the final classification result of the HOI can be "a person holding a cup" (e.g., $S_1 > S_2$).

In the image 304, the HOI detection system can identify an object "cup," a human, a pose of the human, and a relationship between the cup and the human (e.g., relationship between bounding boxes). The HOI tuple can include a set of features, such as object feature, human feature, pose feature, relationship feature. For each potential HOI, the HOI detection system can determine a set of scores for each feature. The HOI detection system also determines sets of word embeddings including, for example, word embeddings for each of "people," "cup," "holding," and "drinking_with." The word embeddings are processed to determine a set of weights, which includes a weight for each feature. Based on the set of weights, the HOI detection system can determine a final score for each potential HOI. For example, for the first possible interaction "a person holding a cup," the HOI detection system can determine a first final score $S_1$. For the second possible interaction "a person drinking with a cup," the HOI detection system can determine a second final score $S_2$. The HOI detection system can determine the interaction with higher weighted score as the final classification result of the HOI in the image 304. In this example, the final classification result of the HOI can be "a person drinking with a cup" (e.g., $S_2>S_1$).

While text embeddings are described above as word embeddings, it is contemplated that implementations of the present disclosure as discussed with reference to FIG. 3 can be realized using sentence embeddings.

Figure 4:
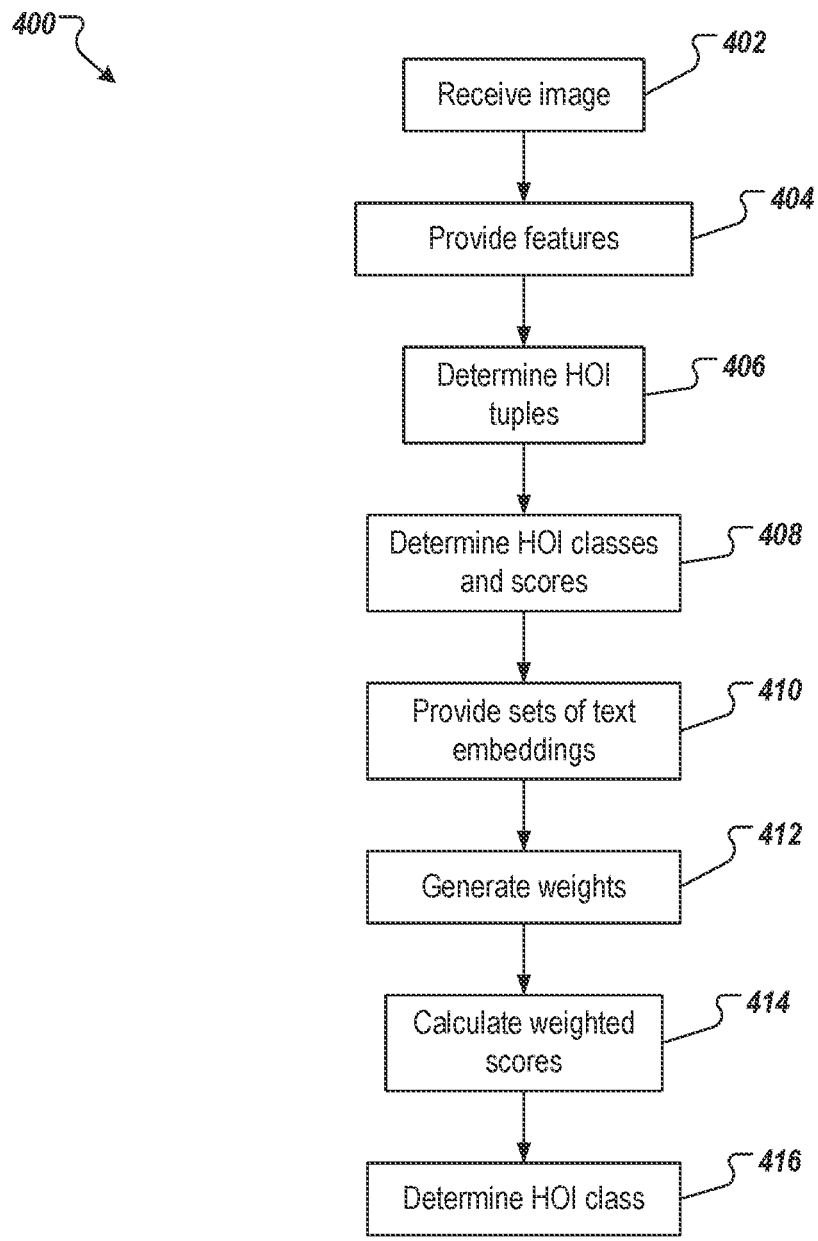
FIG. 4 depicts an example process that can be executed in accordance with implementations of the present disclosure.

FIG. 4 depicts an example process 400 that can be executed in implementations of the present disclosure. In some examples, the example process 400 is provided using one or more computer-executable programs executed by one or more computing devices. The example process 400 of FIG. 4 represents inference to determine an HOI represented in an image using an HOI detection system of the present disclosure.

An image is received (402). For example, and as described herein, an image can be a frame included in a video that is captured by a camera. In some examples, the camera can be installed in a scene of a real-world environment and used to monitor a human's operations/interactions with one or more objects in a task. In some examples, the image is received from a computer-readable memory.

One or more persons, one or more objects, a pose for a respective person, and a respective relationship between each person and object are identified in the image (404). For example, and as described herein, the HOI detection system can detect the person(s), the object(s), pose(s), and relationship(s) using object and human pose detection algorithms. The features of the object and human can also be detected and extracted. In some examples, the relationship is determined from bounding boxes that respectively bound the person and the object within the image.

HOI tuples are determined (406). For example, and as described herein, the HOI tuples can correspond to multiple potential HOIs depicted in the image. Each HOI tuple can include a set of features, such as an object feature, a human feature, a pose feature, and a relationship feature. HOI classes and scores are determined (408). For example, and as described herein, the HOI classes can correspond to the multiple potential HOIs. The HOI detection system can determine the HOI classes for the multiple potential HOIs between the human and the object using the HOI tuple. For each HOI class of a potential interaction, the HOI detection system can use the HOI tuple to generate a feature score for each feature of the respective HOI.

Text embeddings are provided (410). For example, and as described herein, the HOI tuples can be used to determine texts of potential HOIs. For each HOI, a language embedder can convert the respective human, object, interaction text into a text embedding (multi-dimensional vector). In some examples, the text embedding includes word embedding or sentence embedding.

Sets of weights are generated (412). For example, and as described herein, using the sets of text embeddings, a weighted factorization model can generate sets of weights that includes a weight for each feature (e.g., object feature, human feature, pose feature, relationship feature) of a respective HOT. The sets of weights are specific to the image that was received.

Final scores are calculated (414). For example, and as described herein, for each possible HOI class of the potential interaction, the HOI detection system can combine the feature scores using the respective set of weights to generate a final score as a weighted score. The final score can be a weighted sum of the element scores according to the weights in the set of weights.

An HOI class is determined for the image (416). For example, and as described herein, based on the final scores for the possible HOI classes, an HOI class can be selected as an output HOT. For example, the HOI class with the highest final score can be determined as the HOI that is represented in the image.

In an example use case, the identified HOI class can be compared with a pre-defined standard operation procedure (SOP). The SOP can define standard operations or activities performed by a user on objects when completing a task. By comparing the identified HOI class in the image, the HOI detection system can determine whether the human is successfully operating a step in the task. The HOI detection system can provide feedback on identified HOI class indicating whether the HOI class matches the step in the SOP. For example, if the identified HOI class does not match the standard operation in the SOP, the HOI detection system can display an alert (e.g., warning or alarm) on a user interface, which indicates that the human is not successfully operating the current step of the task. If the identified HOI class matches the standard operation in SOP, the HOI detection system can determine that the human successfully operated the current step in the task and proceed to the next step.

By identifying the HOI, the HOI detection system can be used for monitoring users' operations in tasks, and training users in different practices. In some implementations, the system can provide real time feedback to provide guidance for the user. The system can offer encouragement when a step of the task is completed correctly and provide specific guidance for how to improve, when the step is not completed correctly.

The system can provide the feedback as electronic messages to the user using various output interfaces. For example, the system can send the feedback though a device installed in the working environment, such as a speaker, or a screen. The feedback can be a voice message or a text message. In some examples, the system can send the feedback as voice messages through a speaker installed in a device associated with the user, such as the user's mobile phone. In some examples, the system can send the feedback as text messages (e.g., short message service (SMS) messages, emails, and another form of application messages) to the user device.

The order of steps in the process 400 described above is illustrative only, and the process 400 can be performed in different orders. In some implementations, the process 400 can include additional steps, fewer steps, or some of the steps can be divided into multiple steps.

Implementations of the present disclosure achieve one or more technical improvements. For example, implementations of the present disclosure provide time- and resource-efficiencies by reducing an amount of time required for training, as well as reducing a size of the ML model. For example, implementations of the present disclosure can achieve a training time of approximately 6 hours as compared to traditional HOI detection systems (e.g., approximately 70 hours), and can achieve a ML model size of approximately 12 MB as compared to traditional HOI detection systems (e.g., approximately 159 MB). For example, the improved accuracy achieved using weighted factorization of the present disclosure enables the ML models to be smaller and less complicated, because accuracy in HOI detection is not dependent on the ML models alone.

In another example, by considering the weight for each element in different interactions, the HOI detection system described herein can determine the type of interaction more accurately. The HOI detection system can automatically monitor a user's execution of tasks as the user practices a process in a more efficient manner. The HOI detection system can provide various forms of feedback appropriate to the specific user's competencies and gaps. The HOI detection system can provide each user one-on-one attention as the user is performing a certain process and provide customized guidance.

The HOI detection system can monitor user's operations on complex and potentially dangerous equipment that require specific operating procedures. For example, the HOI detection system can monitor user's operations in various industries (e.g., home healthcare, manufacturing, hospitality, construction, food service, etc.).

Because the HOI detection system can determine the interaction corresponding to each step of a task, the system can monitor the user's behavior in performing a task in a fine-grained scale, and provide more accurate guidance and feedback.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for determining human-object-interactions (HOIs) in images, the method comprising:
    receiving an image;
    providing a tuple of features for the image, the tuple of features comprising an object feature, a human feature, a pose feature, and a relationship feature;
    determining a set of HOIs comprising one or more HOIs that are potentially represented in the image;
    providing sets of feature scores by, for each HOI in the set of HOIs, determining, by a first machine learning (ML) model, a set of feature scores for respective features in the tuple of features, each set of feature scores corresponding to a respective HOI in the set of HOIs;
    generating, by a second ML model, sets of weights based on the set of HOIs, wherein generating sets of weights based on the set of HOIs comprises:
        generating, by a third ML model, sets of text embeddings, each set of text embeddings corresponding to a respective HOI,
        processing, by the second ML model, the sets of text embeddings to generate the sets of weights;
    providing a set of final scores by, for each HOI in the set of HOIs, determining a final score based on a respective set of weights and the set of feature scores corresponding to the respective HOI, each final score in the set of final scores corresponding to a respective HOI in the set of HOIs; and
    selecting an output HOI for the image from the set of HOIs based on the set of final scores.

2. The method of claim 1, wherein each set of weights in the sets of weights comprises an object feature weight representing a relative importance of the object feature in selecting the output HOI for the image, a human feature weight representing a relative importance of the human feature in selecting the output HOI for the image, a pose feature weight representing a relative importance of the pose feature in selecting the output HOI for the image, and a relationship feature weight representing a relative importance of the relationship feature in selecting the output HOI for the image.

3. The method of claim 1, wherein determining the output HOI for the image from the set of HOIs based on the set of final scores comprises selecting the output HOI as a HOI with a highest final score in the set of final scores.

4. The method of claim 1, wherein each final score is a weighted sum of features scores by applying respective weights in the set of weights.

5. The method of claim 1, further comprising:
    comparing the output HOI with a step in a pre-defined standard operation procedure (SOP) for a task; and
    proving feedback representative of whether the output HOI correspond to the step in the SOP.

6. The method of claim 1, wherein the sets of weights are specific to the image and an HOI depicted in the image.

7. A system, comprising:
    one or more processors; and
    a computer-readable storage device coupled to the one or more processors and having instructions stored thereon which, when executed by the one or more processors, cause the one or more processors to perform operations for determining human-object-interactions (HOIs) in images, the operations comprising:
    receiving an image;
    providing a tuple of features for the image, the tuple of features comprising an object feature, a human feature, a pose feature, and a relationship feature;
    determining a set of HOIs comprising one or more HOIs that are potentially represented in the image;
    providing sets of feature scores by, for each HOI in the set of HOIs, determining, by a first machine learning (ML) model, a set of feature scores for respective features in the tuple of features, each set of feature scores corresponding to a respective HOI in the set of HOIs;
    generating, by a second ML model, sets of weights based on the set of HOIs,
    wherein generating sets of weights based on the set of HOIs comprises:
        generating, by a third ML model, sets of text embeddings, each set of text embeddings corresponding to a respective HOI,
        processing, by the second ML model, the sets of text embeddings to generate the sets of weights;
    providing a set of final scores by, for each HOI in the set of HOIs, determining a final score based on a respective set of weights and the set of feature scores corresponding to the respective HOI, each final score in the set of final scores corresponding to a respective HOI in the set of HOIs; and
    selecting an output HOI for the image from the set of HOIs based on the set of final scores.

8. The system of claim 7, wherein each set of weights in the sets of weights comprises an object feature weight representing a relative importance of the object feature in selecting the output HOI for the image, a human feature weight representing a relative importance of the human feature in selecting the output HOI for the image, a pose feature weight representing a relative importance of the pose feature in selecting the output HOI for the image, and a relationship feature weight representing a relative importance of the relationship feature in selecting the output HOI for the image.

9. The system of claim 7, wherein determining the output HOI for the image from the set of HOIs based on the set of final scores comprises selecting the output HOI as a HOI with a highest final score in the set of final scores.

10. The system of claim 7, wherein each final score is a weighted sum of features scores by applying respective weights in the set of weights.

11. The system of claim 7, wherein operations further comprise:
- comparing the output HOI with a step in a pre-defined standard operation procedure (SOP) for a task; and
- proving feedback representative of whether the output HOI correspond to the step in the SOP.

12. The system of claim 7, wherein the sets of weights are specific to the image and an HOI depicted in the image.

13. A non-transitory computer-readable storage media coupled to one or more processors and having instructions stored thereon which, when executed by the one or more processors, cause the one or more processors to perform operations for determining human-object-interactions (HOIs) in images, the operations comprising:
- receiving an image;
- providing a tuple of features for the image, the tuple of features comprising an object feature, a human feature, a pose feature, and a relationship feature;
- determining a set of HOIs comprising one or more HOIs that are potentially represented in the image;
- providing sets of feature scores by, for each HOI in the set of HOIs, determining, by a first machine learning (ML) model, a set of feature scores for respective features in the tuple of features, each set of feature scores corresponding to a respective HOI in the set of HOIs;
- generating, by a second ML model, sets of weights based on the set of HOIs, wherein generating sets of weights based on the set of HOIs comprises:
  - generating, by a third ML model, sets of text embeddings, each set of text embeddings corresponding to a respective HOI,
  - processing, by the second ML model, the sets of text embeddings to generate the sets of weights;
- providing a set of final scores by, for each HOI in the set of HOIs, determining a final score based on a respective set of weights and the set of feature scores corresponding to the respective HOI, each final score in the set of final scores corresponding to a respective HOI in the set of HOIs; and
- selecting an output HOI for the image from the set of HOIs based on the set of final scores.

14. The non-transitory computer-readable storage media of claim 13, wherein each set of weights in the sets of weights comprises an object feature weight representing a relative importance of the object feature in selecting the output HOI for the image, a human feature weight representing a relative importance of the human feature in selecting the output HOI for the image, a pose feature weight representing a relative importance of the pose feature in selecting the output HOI for the image, and a relationship feature weight representing a relative importance of the relationship feature in selecting the output HOI for the image.

15. The non-transitory computer-readable storage media of claim 13, wherein determining the output HOI for the image from the set of HOIs based on the set of final scores comprises selecting the output HOI as a HOI with a highest final score in the set of final scores.

16. The non-transitory computer-readable storage media of claim 13, wherein each final score is a weighted sum of features scores by applying respective weights in the set of weights.

17. The non-transitory computer-readable storage media of claim 13, wherein operations further comprise:
- comparing the output HOI with a step in a pre-defined standard operation procedure (SOP) for a task; and
- proving feedback representative of whether the output HOI correspond to the step in the SOP.

18. The non-transitory computer-readable storage media of claim 13, wherein the sets of weights are specific to the image and an HOI depicted in the image.

\* \* \* \* \*